United States Patent Office 3,233,015
Patented Feb. 1, 1966

3,233,015
METHOD OF MAKING MONOLITHIC REFRACTORY LINING IN METALLURGICAL VESSELS
Ben Davies, Pittsburgh, Pa., assignor to Harbison-Walker Refractories Company, Pittsburgh, Pa., a corporation of Pennsylvania
No Drawing. Filed Jan. 3, 1964, Ser. No. 335,678
9 Claims. (Cl. 264—30)

This invention relates to fabrication of monolithic refractory lining. More particularly, this invention relates to method of fabricating chemically basic, monolithic refractory furnace bottoms.

I believe my invention is a great advance in the art of making furnace bottoms of chemically basic refractories. This is an art in which there have been progressive improvements during the last 30 years which have drastically changed the character of furnace practice. Ordinarily, furnace walls are constructed of brick but the bottoms, in many cases, have been of monolithic materials supplied in unconsolidated or granular form (usually less than 4 mesh Tyler), this dating substantially to the birth of metallurgy. With the advent of the basic open hearth steelmaking furnace, the standard practice became that of building up furnace bottoms using dead burned magnesite or dolomite and burning it in layer by layer and inch by inch.

The foregoing burn in practice consumed quite a few days, sometimes two or three weeks, and was costly in terms of furnace availability. A greater advance was made about 25 years ago when bonding agents (setting initially at room temperature) were combined with the dead burned refractory grain so that the entire thickness of the hearth, frequently 18" or more, could be applied at one time and steelmaking could be begun within a day or two. That such a step was at all possible was a matter of surprise to refractory technologists because the bonding agent, frequently sodium silicate, introduced water or required additions of water and, hence, exposed the dead burned refractory grain to the possibility of hydration. This was, in fact, not an empty fear since hydration of entire furnace bottoms did occur in several instances causing buckling and heaving and requiring their entire replacement.

Installation of the open hearth bottom is an industrial project of major proportions. It may require the handling of as much as 150 tons of material which must be charged through the furnace through the limited access of the furnace charging openings. In consequence, anything which goes wrong and requires replacement of the hearth is viewed with alarm.

With the advent of more hydration resistant dead burned basic refractory grain, in particular, dead burned magnesite (for example, that produced according to U.S. Patent 3,060,000, Leatham et al.) ramming techniques (which require very little water) were employed to make chemically basic furnace bottoms. This more hydration resistant grain served, in great part, to overcome the buckling and heaving noted above. However, it has been realized for some time that ramming is a tedious and time consuming job and that the resulting installation is subject to variations in quality because of the frequently unskilled operators who do the ramming. There is no easy way for an inspector of the job to know whether it is being sufficiently rammed. For example, insufficient ramming may consequently produce areas of low density and high porosity which will be far more susceptible to corrosion and attack during furnace operation which influence furnace life. Also, while hydration ceased to be a major problem, one high purity, high density systems which used these newer hydration resistant grains proved vulnerable to explosion.

It has long been realized that a method not subject to these porosity and density variations would be the casting or pouring of settable dead burned basic hearth material. The casting of refractories into place has a further advantage in that the material can be made to conform to almost any desired shape. Thus, a hearth can be cast completely, including provision for one or more tap holes. Also, the material may be cast into intimate contact with any brickwork which is not removed from the furnace.

Unfortunately the increase in moisture requirement, from about 2 to about 7%, to bring the magnesite grain from ramming to casting consistency, greatly aggravates the difficulty of protecting from reaction with water even the more hydration resistant dead burned magnesite. Further, explosion would be an even greater possibility. To form a proper bottom, it is essential that all water escape from the furnace and the hearth as vapor. It has taken years to solve the problem of getting rid of even the minor amount of moisture of the rammed bottom and even this small amount of moisture still causes problems in some instances.

The exact mechanism that makes these monoliths vulnerable to explosion is not known, but it can be said with some certainty that portions of the structure are sufficiently impervious that upon burn in, steam is generated faster than it can be dissippated. When the steam pressure exceeds the strength of the monolith an explosion results. If the monolith is weak, the explosion is minor; but if the monolith is strong, the explosion is violent and dangerous.

In a 150 ton rammed bottom application, on the order of about 2 to 4%, water is required; that is, about 3 to 6 tons of water. For casting this amount of dead burned magnesite, requiring on the order of 7% to 10% water, there are over 10 tons of water which must be removed by vaporization. Vaporization is slow. During the vaporization, the warm, or hot moist bottom is even more highly susceptible to hydration.

Whether the refractory be cast or rammed into place, it has been held without exception that success depends on getting the water out of the bottom materials as quickly as possible so the dead burned magnesite will not hydrate and expand or explode. Within the limits of even the better planning there are unavoidable delays; the elapse of time can be divided into four periods, as follows:

(1) Casting or ramming the hearth.
(2) Delays for removing primary tools, and scaffolding, and to clean the furnace, etc.
(3) Additional delays, some unplanned, and others for getting the furnace closed up (placing doors etc.), and putting burners in condition for firing.
(4) Burning in by heatup of the furnace prior to the charging of hot metal and scrap to make steel.

Up until this time, the careful planning which is essential for maturing the bottom has been concentrated on No. 4 to make certain that it gets underway promptly and that even the heating up is not at so rapid a rate as to give rise to violent evolution of water vapors (steam) with resulting explosion. Insofar as any attention has been given to periods Nos. 2 and 3, it has been thought that any drying taking place during these delays would be all to the good. That much drying out does occur in these periods is well known to the refractory technologists. It is evidenced by the whitening of the cast refractory surface and by the hard rock-like surface it develops. I have discovered, contrary to the prior understanding in the art, that instead of being beneficial, the drying which takes place before planned heatup can be exceedingly harmful. I believe that what has been considered a hydration problem is, in fact, a distinctly different phenomenon. My invention radically departs from the prior art drying out practice, and instead of hastening the removal of water, we assure the maintenance of high water content uniformly through the cross-section of the cast material prior to actual burn in.

In my copending U.S. application, Serial No. 335,689, entitled "Method of Making Monolithic Refractory Lining in Metallurgical Vessels and the Like," filed of even date herewith, a novel process is taught for casting chemically basic monolithic refractory bottoms and the like in which means are provided to maintain the initial water in the cast or rammed installation at substantially the same level as that used in the initial installation whereby explosion is prevented and a better installation results.

It is an object of this invention to provide a new method of making a monolithic chemically basic refractory installation in metallurgical vessels and the like.

It is another and further object of the present invention to provide a novel method for making chemically basic monolithic refractory linings by casing or ramming in place a granular refractory material (usually less than 4 mesh, on the order of 40 to 60% being +65 mesh).

It is yet another object of the invention to provide a novel method of fabricating chemically basic monolithic refractory lining which method prevents explosive spalling on heatup.

In the foregoing objects and in the following discussion by "heatup" and "burn in" I mean initial burning of the bottom or monolithic lining to temperatures on the order of about 2900° F. and more.

It is still another object of the invention to provide a new method of fabricating a chemically basic monolithic refractory bottom or lining in a metallurgical vessel or the like substantially entirely of granular dead burned magnesite.

These and other objects and advantages of my invention will be apparent to those skilled in the art from a study of the following detailed description. The examples set forth are illustrative of the best modes now known for the practice of my invention, but are not intended as limiting. Rather the true spirit and scope of the invention is defined by the claims.

*Example I*

A batch of commercially available castable dead burned magnesite grain was prepared (I used "H–W Perimix," a proprietary dead burned magnesite, a product of the Harbison-Walker Refractories Company). The magnesite was mixed with about 7 parts, by weight, based on the dry solids of water. The wet mixture was cast into large blocks approximately 18 x 18 x 10". The blocks were cast in open topped metal molds. One block was allowed to stand overnight (about 12 hours) and then tested by exposing the open face to the door of a test furnace where its temperature could be raised to about 2000° F. in about 30 minutes. The cast refractory shape withstood this severe test without exploding and with negligible surface spalling.

*Example II*

When the above test was repeated on a second of the blocks made in the manner discussed in Example I above, after it has been exposed to the atmosphere for three days (about 72 hours), the block exploded. Delays of three days duration are common in industrial practice. The Example II procedure of exposing the block to the atmosphere for about 72 hours was repeated several times with the same explosive results.

*Example III*

Another of the cast blocks made in the manner discussed under Example I was also allowed to stand for three days (about 72 hours). The exposed surface was noticeably whitened and quite hard. For example, a metal instrument such as a screwdriver could be rapped on the exposed surface with little effect besides minor dusting. Water was sprayed from a conventional garden hose type nozzle over the exposed surface of the brick. The spray was at a relatively slow rate in order to prevent rivulets from forming and eroding and carrying away part of the cast materials. The spraying was repeated through a series of applications until the top was slick and glistening. It could be said a relatively uniform "sheen" appeared to cover the upper surface. There were no dry matte appearing areas. There was substantially uniform water content from the bottom to the exposed top, i.e. from 6 to 8% of water based on the dry weight of the solids. (There is a slightly higher water content in the first inch or so, measuring from the exposed top, i.e. 8% as opposed to 7%, for example.) The block was exposed to the same test described under Examples I and II above. No explosion occurred and the block was satisfactorily burned.

*Example IV*

A preferred embodiment of the invention is as follows: A batch is prepared consisting of (1) dead burned magnesite (analyzing at least about 92% Mgo, by weight, on an oxide basis), (2) bonds, (3) plasticizer, if desired, and (4) water. The magnesite constitutes at least about 90%, by weight, of the batch and is size graded so that 30 to 70%, by weight, is held on a 28 mesh screen, the rest is —28 mesh. From 1 to 10% (3% preferred) by weight of the sodium silicate powder, having a $Na_2O$ to $SiO_2$ ratio between 1:1 and 1:3.22 (1:3.22 is preferred), is added to the magnesite. Up to about 5%, by weight, of plasticizers, selected from the group consisting of kaolinitic and montmorillonitic clays and volatilized silica, may be added to the batch if desired. The resulting batch is tempered with 5 to 10%, by weight, of water, based on the total weight of the dry solids (preferably 6 to 7%). The wet mixture is placed in an open hearth furnace bottom. After the exterior or exposed surface of the bottom whitens and assumes a hard set characteristic, it is sprayed with water at such a rate as to avoid formation of rivulets or like runoff for a time period and to an extent sufficient to obtain a slick, glistening sheen over the exposed surface, free of standing or casually dispersed water, and free of dry matte-appearing area. When the bottom satisfies the description of appearance, it has a water content between about 6 and 8%.

It is desirable to allow initial drying and then to at least surface wet the bottom, i.e. subsequent retempering, for reasons other than to overcome the possibility of explosive spalling. This allowance to dry appears to serve as a maturation period during which substantially uniform bond distribution occurs to thereby provide a superior monolithic structure after burn in because of extensive and more uniform distribution and set of the bond ingredients.

In one respect my invention relates to a preliminary phase of maturation of a hearth or the like of which dead burned magnesite is a preponderant constituent (or at least 40 and preferably over 50%, by weight). Chrome ore, alumina, olivine, forsterite, silicon carbide, zircon, calcined clays and bauxitic materials can be mixed with the magnesite to constitute the remaining 60% or less of the total mix. These materials should be in the coarser or —3 +28 mesh range (some can be as coarse as ¼", i.e. up to about 5%, by weight) because 30 to 50% of the mix must be fine magnesite, i.e. —65 mesh with the major portion of the —65 mesh material (40 to 60%) being +325 mesh.

Having thus described my invention in detail and with sufficient particularity as to enable those skilled in the art to practice it, what I desire to have protected by Letters Patent is set forth in the following claims.

I claim:
1. A method of making a chemically basic refractory monolith comprising the steps of:
   (1) combining a dry solids batch mixture of,
      (a) at least about 90%, by weight, of granular dead burned magnesite sized such that 30 to 70%, by weight, is about −3 +28 mesh and about 70 to 30%, by weight, passes a 65 mesh screen,
      (b) 1 to 10%, by weight, of powder sodium silicate capable of reacting with magnesite which passes the 65 mesh screen to set the batch when it is tempered,
      (c) up to about 5%, by weight, of plasticizing agent selected from the group consisting essentially of kaolinitic and montmorillonitic clay and volatilized silica,
      (d) the chemical analysis on an oxide basis of the batch being at least about 90%, by weight, MgO,
   (2) and tempering with about 3 to 10%, by weight, of an aqueous tempering agent, based on the total weight of the dry solids in the batch,
   (3) emplacing the tempered batch into the situs of use,
   (4) allowing the emplaced material to set for a time period sufficient for at least the upper surface to dry out and become hard and rock-like and characterized by whitening and a matte apearance,
   (5) retempering the emplaced material with additional aqueous tempering agent in a quantity sufficient to obtain a substantially uniform water content from top to bottom, and
   (6) immediately subjecting the emplaced material to burn-in.

2. The method of claim 1 in which the emplaced material is allowed to set for at least about 72 hours before being retempered.

3. The method of claim 2 in which the burn-in is to a temperature of at least about 2900° F.

4. The method of claim 1 in which the retempering is continued until there is on the order of about 6 to 8% water content uniformly throughout the emplaced material.

5. A method of making a chemically basic refractory monolith comprising the steps of, preparing a dry refractory batch mixture consisting essentially of at least about 40%, by weight, of dead burned magnesite of at least about 90% MgO content, by weight, and on an oxide basis, from 1 to about 10%, by weight, of powder sodium silicate capable of reacting with the magnesite to set the batch when it is tempered, up to about 5%, by weight, of plasticizing agent selected from the group consisting essentially of kaolinitic and montmorillonitic clay and volatilized silica, the remainder of the batch consisting essentially of material selected from the group chrome ore, alumina, olivine, forsterite, gannister, silicon carbide, zircon, calcined clays and bauxitic materials, said latter materials substantially all being about −3 +28 mesh, from 30 to 50% of the total batch being −65 mesh magnesite, tempering the dry ingredients with from about 3 to about 10%, by weight, based on the total dry solids in the batch, of an aqueous tempering agent, immediately emplacing the tempered batch into the situs of use, allowing the emplaced material to mature for a time period sufficient to produce a hard rock-like exposed surface characterized by whitening and matte appearing areas, retempering the matured bottom by subjecting it to additional aqueous tempering material in a quantity sufficient to again obtain a substantially uniform tempering agent content from top to bottom and produce a wetted sheen over the exposed surface, and immediately burning-in the retempered material.

6. The method of claim 5 in which the emplaced bottom matures for at least about 72 hours before retempering.

7. The method of claim 5 in which the bottom is burned-in to a temperature of at least about 2900° F.

8. The method of claim 5 in which the tempering agent is water and in which it is applied in the retempering step by spraying.

9. The method of claim 5 in which the tempering agent is initially present in an amount between 6 and 8%, by weight, of the total dry solids and in which the retempering again obtains a substantially uniform 6 to 8%, by weight, tempering agent content from top to bottom of the matured material.

No references cited.

ROBERT F. WHITE, *Primary Examiner.*

J. A. FINLAYSON, *Assistant Examiner.*